3,236,763
CRACKING OF HYDROCARBONS
Karel Swart and Ernst Th. van der Laan, The Hague, Netherlands, assignors to Shell Oil Company, New York, N.Y., a corporation of Delaware
Filed July 11, 1962, Ser. No. 210,303
Claims priority, application Netherlands, Oct. 31, 1958, 232,803
12 Claims. (Cl. 208—129)

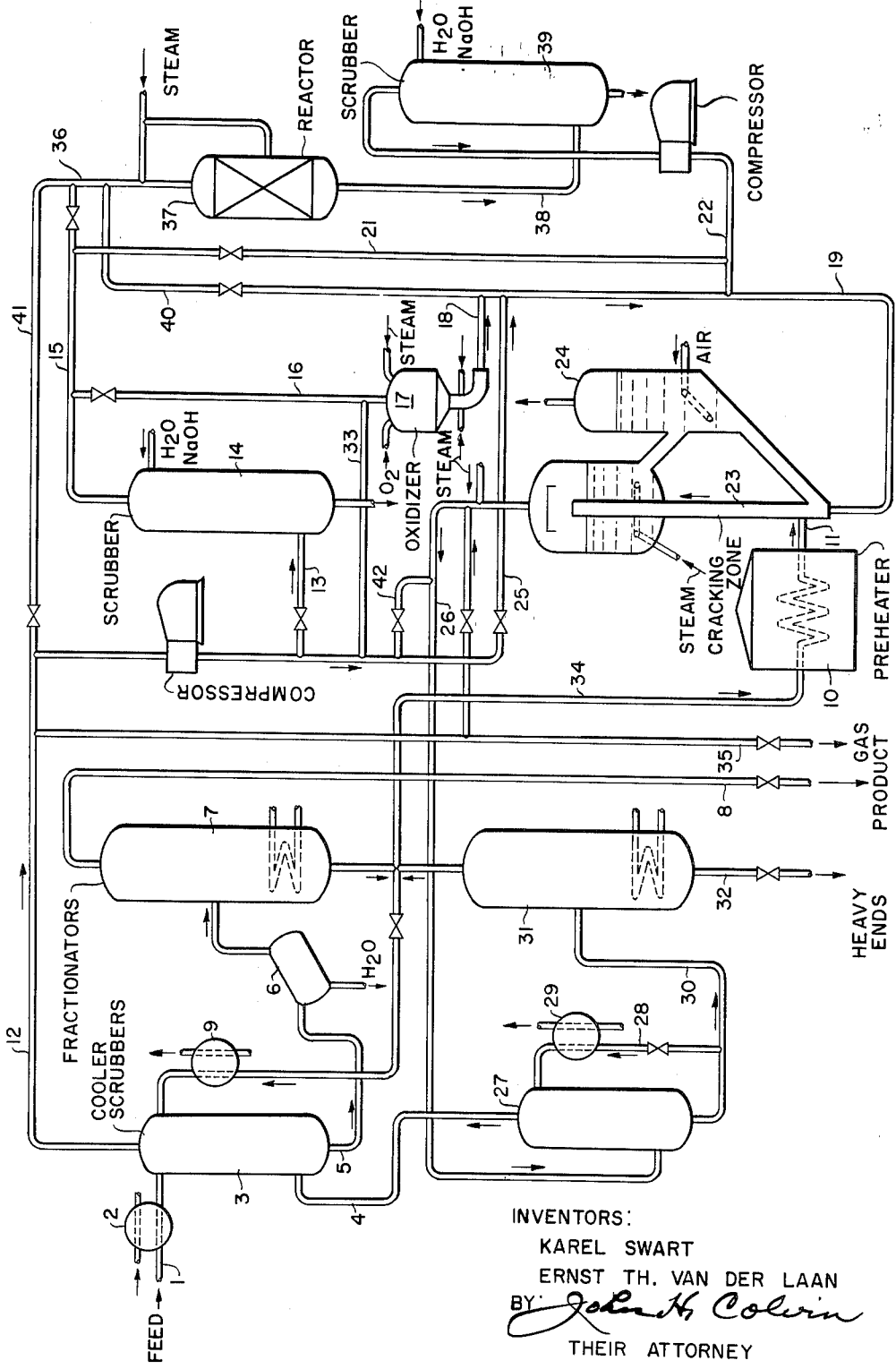

This application is a continuation-in-part of application Serial No. 842,931 filed September 28, 1959, now abandoned.

This invention relates to the cracking of refractory hydrocarbon oils under pressure and at a high temperature in the presence of recycle gas.

It is known that refractory hydrocarbon oils which are difficult or impractical to crack by the conventional thermal methods can be converted in fair yields to valuable lower boiling products by subjecting them to a short time high temperature thermal cracking process in the presence of a gaseous diluent. In most of the hitherto proposed processes the gaseous diluent has been merely hot combustion gases used solely as a means of raising the oil feed to the desired high temperature. In some cases, however, the heat has been supplied by circulating hot pebbles and hydrogen has been used as the diluent. In another case a hot mixture of carbon monoxide and hydrogen obtained by the partial combustion of the heavy residue from the process has been suggested. While this is possible in theory it is found that when one attempts to produce gas mixture from such residues one either obtains mostly carbon dioxide or a gas mixture containing an inordinate amount of soot and tar which tend to foul the vessels and are at the very least most annoying unless exceedingly large vessels are employed. Also in this case the gas is used on a once-through basis and the tremendous amounts of the gas required to supply the heat are produced by the process. The residue normally contains considerable amounts of sulfur (up to 7% in some cases) which is converted to hydrogen sulfide, carbonyl sulfide, etc. in the gasification process.

The process of the present invention provides a novel and advantageous cracking process wherein a gas consisting largely of carbon monoxide is continuously recycled and where only a small net gas make is involved. Also the present process produces little if any soot and consequently a reactor of small volume may be used. This is important because the construction of a reactor of large volume designed to operate under the high pressures and high temperature involved is extremely costly.

In general outline the process involves the steps of scrubbing recycled product gas to remove $CO_2$, dividing the gas stream into two streams, reacting one of said streams with oxygen under pressure to produce a partially oxidized gas, adding to said partially oxidized gas the other of the mentioned two gas streams, adding to the resulting stream the hydrocarbon oil to be cracked and passing the mixture under pressure and at a temperature of about 500 to about 1000° C. through a cracking zone, cooling and scrubbing the effluent from the cracking zone in the presence of normally liquid product of the process, separating from the cooled products the above mentioned recycled product gas, normally liquid cracked products, and a residue fraction. In the preferred embodiment the vaporous effluent from the cracking zone is also scrubbed by countercurrent contact with the liquid feed oil to be cracked to ensure a gas mixture substantially free of all normally liquid hydrocarbon material.

The process of the invention is particularly advantageous for the cracking of oils which are too refractory for efficient cracking by the conventional thermal cracking methods, e.g. the Dubbs process. Such oils normally contain or consist largely of aromatic hydrocarbons having mostly only short side chains. The starting material may be a mono or polycyclic aromatic compound containing one or more alkyl and/or cyclic alkyl groups as well as compounds in which a naphthene ring is condensed with an aromatic ring such as tetrahydronaphthalene and derivatives thereof. Such compounds may be processed singly or in the form of mixtures with each other and/or with one or more non-aromatic hydrocarbons. Suitable starting materials therefore include aromatic-containing fractions obtained in the distillation of crude oil and also aromatic rich products obtained in the further physical and/or chemical processing of petroleum fractions. In this connection special reference is made to gasoline obtained by thermal and/or catalytic reforming (in particular the higher boiling fractions), the fractions formed in the catalytic cracking of heavy fractions and boiling in the gas oil range (cycle stocks), as well as aromatic rich extracts from gasoline (especially the higher boiling ends of catalytically reformed gasoline), kerosene, and the said recycle oils. The aromatic-rich mixtures obtained as by-product in the production of gas from coal are also suitable. In general, in producing the starting material for the process it is advisable to avoid contact with oxygen.

The process will be described in more detail with reference to the accompanying drawing which is a schematic flow diagram illustrating the main apparatus and process flows in a preferred embodiment of the invention.

The liquid oil to be cracked, entering by line 1, is cooled in cooler 2 to a temperature preferably not above 30° C., e.g. 10° C., and passed to the top of tower 3 wherein it is contacted with cracked products introduced by line 4. The oil and condensed water are withdrawn from the tower and passed by line 5 to a separation vessel 6. The water phase is removed and the oil is then passed to a fractionating column 7 which is operated to separate overhead the lower boiling cracked products which are withdrawn from the system by line 8 leaving a higher boiling residue consisting mainly of fresh feed but also containing some material that was insufficiently converted. Part of this higher boiling product is preferably cooled by cooler 9, e.g. to 30° C. and cycled back to the top of tower 3. The remainder is preheated in preheater 10 and passed by line 11 to the cracking zone.

The gas issuing from the tower 3 consists mostly of carbon monoxide, methane, and hydrogen but also contains appreciable amounts of carbon dioxide along with traces to small amounts of other normally gaseous hydrocarbons and inerts. This gas, however, should be entirely (in a practical sense) free of pentane and other normally liquid hydrocarbons. This condition is ensured by proper control of the amount and temperature of the cooled scrubbing liquids introduced over the top of tower 3. This gas withdrawn by line 12 is passed by line 13 to tower 14 wherein it is contacted with a liquid for absorbing carbon dioxide. This liquid may be water but is preferably one of the conventional alkaline solutions such as an alkanolamine or a solution of $Na_2CO_3$—$NaHCO_3$, NaOH, or the like. The gas having at least some of its carbon dioxide removed is then split into two streams which are separately handled. One of these streams is passed by lines 15 and 16 to a combustion zone 17. Commercial oxygen, or at least a gas rich in oxygen, and in most cases a little steam, is supplied to the combustion zone in amounts less than stoichiometrically required for complete combustion but sufficient to raise the temperature of the gas to at least about 1000° C., e.g. 1300° C. The pressure is substantial and preferably in the range of from 5 to 35 atm. gauge. Various types of burners may be used. A very suitable arrangement is that shown in British Patent No. 780,120. Additional steam may be added near the combustion chamber exit to cool the combustion products. The resulting partially oxidized gas is then passed by lines 18 and 19 to the cracking zone.

The second portion of the gas withdrawn from tower 14 is passed by lines 15, 21 and 22 and is combined with the partially combusted gas in line 19 and likewise passed to the cracking reactor. Thus, a portion of the gas mixture is passed to one or more points between the combustion zone and the cracking zone and this portion (called recycle gas) is simply recycled to the cracking zone. This recycling results on the one hand in a saving in the quantity of oxygen required, and, on the other, in a cooling of the very hot combustion gases (e.g. 1300° C.) to such a temperature that the temperature in the cracking zone in which exothermic reactions take place cannot rise to inadmissibly high values. When operating in this way no special equipment is required for cooling the hot gases. The combustion gases are preferably cooled to a temperature of from 500° C. to 1100° C., e.g. 600° C. The temperature to be reached determines the quantity of gas mixture to be recycled directly to the cracking zone.

The preheated feed entering by line 11 and the hot gas mixture entering by line 19 are passed together through the cracking zone 23. The cracking is carried out thermally, viz. without deliberate contact with catalytically active materials. The pressure is, for example, 5 to 35 atm. gauge. The cracking zone may be empty of solids or it may contain a small amount of agitated refractory solids to scour the walls. In one embodiment a sizeable amount of finely divided inert solid material is present. Thus, in the apparatus illustrated in the drawing the thermal cracking zone consists primarily of the vertical pipe-like reactor 23. The inert refractory solid, e.g. sand, is continuously fed to the bottom of the reactor and is carried up through the reactor by the ascending vapors. Some carbonaceous matter deposits on the solid material. This can be removed by burning in the small side vessel 24. The circulation of the solid is preferably the minimum necessary to prevent balling or sticking of the particles due to carbonaceous deposits.

While the solid material is suitably completely inert with respect to the cracking reaction and such material is contemplated it should be noted that a solid material having a certain amount of catalytic activity can be used provided that the activity is not one which leads mainly to dehydrogenation. The use of a catalytically active solid is often desirable since in a purely thermal conversion rather pronounced and excessive carbon formation is sometimes encountered, which leads to plugging of the reaction zone and/or of associated equipment and thus requires frequent cleaning. Representative catalytic solids which may be used are activated alumina, e.g. alumina which has been impregnated with a hydrogen fluoride solution, dried and heated; siliceous cracking catalysts, e.g. silica-alumina; organo-aluminum compounds; oxides or metals of Groups VIa or VIII of the Periodic Table supported on a carrier, e.g. alumina, chromia-alumina, kieselguhr, magnesia-containing alumina, a high purity low sodium content gamma alumina, for example catalysts prepared by impregnating alumina with a nickel, cobalt or iron salt, heating to 650° C. and treating with an acid, e.g. sulfuric acid; combinations of zinc chloride and alumina; and iron oxide combined with alumina and soda. With catalytically active solids, cracking temperature can be in the range from about 300° to 750° C.

Steam (water) is preferably added to the effluent from the thermal cracking zone which may, for example, have a temperature around 800° C. Also some cool gas from line 12 may be introduced by line 42 to reduce the temperature to, for example, around 400° C. The vaporous mixture is passed by line 26 to the bottom of tower 27 where it is desuperheated and cooled sufficiently to condense a portion of the highest boiling materials while the vapors are scrubbed with recycled condensate introduced by line 28. This recycle condensate stream is cooled by cooler 29. The net condensate is passed by line 30 to distillation column 31. Heavy bottoms are removed from column 31 by line 32. These bottoms may be recycled in part if desired. The overhead from fractionating column 31 consists mainly of unconverted and insufficiently converted material. It is passed by lines 34 and 11 to the thermal cracking zone.

The still vaporous material leaving the top of tower 27 contains the cracked products and gases. It is passed by line 4 to tower 3 as described above.

In completing the cycle there is only a small net gas make. This excess gas is removed by line 35.

The process flow illustrated provides for an advantageous alternative operation. In this alternative operation that portion of the gas passed by lines 15, 21 and 22 is not so passed, but instead is passed by line 36 to a water gas shift reactor 37 wherein it is contacted with steam and a conventional water gas shift catalyst under conventional water gas shift conditions, e.g. 400° C. The effluent from this reactor 37 is then passed by line 38 to tower 39 wherein carbon dioxide produced by the water gas shift is removed. This tower operates in the conventional manner. The thus-treated gas is then passed to line 19 by line 22. In this alternative it is advisable to pass part of the gaseous product from the combustion zone by lines 18 and 40 also to the water gas shift reactor. It should be pointed out that this alternative operation, as compared to the first alternative, allows the total amount of gas circulated to be reduced significantly. Also the consumption of oxygen is reduced by nearly 50% and the size of the adsorber tower is decreased. The amount of gas withdrawn by line 35, i.e. net gas make, is about the same but the gas has a lower density and higher calorific value. These advantages, while substantial, are obtained at the cost of providing and operating the water gas shift unit.

The water gas shift conversion may be effected at various points in the gas cycle. If it is effected at a point where the stream to be recycled has not yet been split into the portion to be passed to the combustion zone and the portion to be recycled to the cracking zone the water gas shift is of course carried out before the mentioned removal of carbon dioxide from the gases to be recycled.

It is also possible to subject only the gases to be recycled to the cracking zone to the water gas shift conversion. In this case if desired removal of carbon dioxide may be applied twice, i.e. to the still combined stream of gases to be recycled to the combustion zone and the cracking zone and to the gases after they have passed through the water gas shift zone. It is also possible, however, to remove carbon dioxide only once, e.g. after the water gas shift stage but in this embodiment the oxygen consumption in the combustion zone is higher than in the above described case in which there are two carbon dioxide removal steps.

EXAMPLE I

In a process as illustrated in the drawing and described in the first embodiment in which the water gas shift operation is omitted, 175 tons per day of heavy platformate having an average composition of $C_{10}H_{14}$ is charged to the unit. After passing through the cooler-scrubber and fractionator as described this feed is thermally cracked at a pressure of 30 atmospheres absolute along with the hot gas mixture supplied through line 19. This gas mixture has the following composition in tons per day:

CO _____ 604.2
$CO_2$ _____ 67.0
$H_2O$ _____ 45.7
$CH_4$ _____ 40.2
$H_2$ _____ 22.0

The temperature at the exit of the cracking zone is approximately 800° C. This effluent contains the following in tons per day

| | |
|---|---|
| $C_6$–$C_8$ aromatic products | 78.0 |
| Heavier hydrocarbons | 24.2 |
| $CH_4$ | 123.4 |
| CO | 604.2 |
| $CO_2$ | 67.0 |
| $H_2$ | 11.6 |
| Steam | 45.7 |

This mixture is partially cooled and separated by adsorption and distillation into product dry gas (806.2 tons per day), a fraction of $C_6$–$C_8$ aromatic products (78.0 tons per day) which is withdrawn as product, and into a fraction consisting of heavier hydrocarbons (24.2 tons per day) which is also withdrawn as product. Also the steam present is almost entirely removed in the form of water.

Of the 806.2 tons of the gas 705.1 tons are recycled by line 12 and the remainder is drawn off as a bleed stream through line 35. The composition of the bleed stream in tons per day is

| | |
|---|---|
| CO | 75.7 |
| $CH_4$ | 15.5 |
| $CO_2$ | 8.4 |
| $H_2$ | 1.5 |

The carbon dioxide is almost entirely removed from the recycled portion by washing with an $Na_2CO_3$—$NaHCO_3$ solution at 80° C. in scrubber 14. The resulting gas mixture amounting to 604.5 tons per day is passed to the combustion zone 17 in an amount of 405.6 tons per day. The remainder is passed by line 22 to line 19 where it is mixed with the hot combustion products. The portion of the gas passed to the combustion zone 17 is reacted with 132.6 tons per day of oxygen under a pressure of 32 atm. abs. The resulting hot gases in a quantity of 538.2 tons per day and at a temperature of 1300° C. contains

| | |
|---|---|
| CO | 407.3 |
| $CO_2$ | 67.0 |
| $H_2O$ | 45.7 |
| $H_2$ | 18.2 |

The temperature of the combined gas stream in line 19 is approximately 730° C.

EXAMPLE II

In a process as shown in the drawing where the water gas shift zone is in operation and starting with the same quantity of the same feed stock and wherein the thermal cracking is effected under the same conditions, the effluent from the thermal cracking zone contains in tons per day

| | |
|---|---|
| $C_6$–$C_8$ aromatic products | 79.2 |
| Heavier hydrocarbons | 23.0 |
| Methane | 145.9 |
| $H_2$ | 11.8 |
| CO | 87.1 |
| $CO_2$ | 8.9 |
| Steam | 17.4 |

This mixture is separated by adsorption and distillation into a product gas (253.7 tons per day) a $C_6$–$C_8$ aromatic product (79.2 tons per day) and 23.0 tons per day of residue which is withdrawn. The water is of course also removed.

The gas in an amount of 192.2 tons per day is recycled by line 12 and carbon dioxide is removed from this portion by scrubbing with an $Na_2CO_3$—$NaHCO_3$ solution at 80° C. in scrubber 14. The resulting 185.5 tons per day of essentially $CO_2$ free gas is passed in a quantity of 80.2 tons per day to the partial combustion zone and remainder is recycled to the cracking zone.

In the combustion zone the portion of the gas passed thereto is reacted with 72.7 tons per day of oxygen under a pressure of 32 atm. abs. In this case the effluent from the combustion zone in a quantity of 152.9 tons per day and at a temperature of 1300° C. contains in tons per day

| | |
|---|---|
| CO | 104.6 |
| $H_2$ | 13.2 |
| $CO_2$ | 11.9 |
| Steam | 23.2 |

Of this mixture 114.6 tons per day are withdrawn by line 19 and the remainder is passed to the water gas shift converted 37 where it is contacted with steam in the presence of a water gas shift catalyst at an inlet temperature of about 400° C. The amount of steam supplied is 109.5 tons per day. The effluent from the reactor 37 is then scrubbed in scrubber 39. The effluent from this scrubber contains in tons per day

| | |
|---|---|
| $CH_4$ | 62.8 |
| $H_2$ | 12.3 |
| CO | 8.7 |

This stream is then passed to the thermal cracking zone along with the other gas.

The scrubbers 14 and 39 are preferably operated at temperatures between ambient temperature and about 100° C.

The partial combustion of the recycle gas and the thermal cracking are preferably carried out at substantially the same pressure. The gas mixture to be recycled is also preferably recovered at pressures approximately equal to those in the combustion zone and cracking zone. Where possible this also applies to all further treatments of the gas.

In certain cases it is also advantageous to provide a second combustion reactor which operates in parallel to combustion reactor 17. This parallel reactor (not shown) is fed with gas direct from line 12, either upstream or downstream of tower 14, and the product is passed to the water gas shift reactor 37 and $CO_2$ scrubber 39 are then combined with the product from combustion zone 17. The amount of gas fed to this second combustion zone is such that when the combustion products are diluted with the recycle gas stream and steam, a suitable inlet temperature for the water gas shift conversion is obtained.

We claim as our invention:

1. Process for the cracking of refractory aromatic oils which comprises cooling and scrubbing the vaporous product from a cracking zone, which product is obtained as hereinafter specified, to separate said product into a normally liquid fraction of cracking products and a normally gaseous product fraction substantially devoid of normally liquid hydrocarbon substituents, treating at least a portion of said gaseous product fraction with an absorbent for $CO_2$ under conditions to remove at least a part of the $CO_2$, dividing the treated fraction into two parts (a) and (b), reacting part (a) under a pressure of from about 6 to 36 atmospheres in a partial combustion zone with an oxygen-rich gas in an amount sufficient for combustion to CO and insufficient for complete combustion to $CO_2$, combining part (b) with the product from said partial combustion zone, contacting the oil to be cracked with the combined gas stream in a cracking zone under a pressure of from about 6 to 35 atmospheres, cooling the vaporous effluent from said cracking zone, and separating therefrom normally liquid cracked products and a gaseous fraction consisting predominantly of carbon monoxide which is recycled at least in part as aforesaid.

2. Process for the cracking of aromatic oils which comprises mixing the aromatic oil to be cracked with recycled product gas substantially free of condensable hydrocarbons and hot partially combusted product gas in an amount to provide a cracking temperature in the range from about 300° C. to 750° C., passing the mixture in the vapor phase through a cracking zone under a pressure between about 6 and 36 atmospheres, separating the effluent from said cracking zone into a residual fraction, a normally liquid cracked product fraction and a normally gaseous fraction consisting predominantly of carbon monoxide and containing no appreciable amount of normally liquid hydrocarbon constituents, scrubbing carbon dioxide from at least a portion of said normally gaseous fraction, passing a first portion of the scrubbed normally gaseous fraction as recycle product to said cracking zone, partially combusting a second portion of said scrubbed normally gaseous fraction with commercial oxygen at a temperature above 1000° C., the partial combustion favoring the formation of CO rather than $CO_2$, and passing the combustion gases to said cracking zone as said hot partially combusted product gas.

3. The process according to claim 2 wherein a first portion of the product of said partial combustion zone is mixed with said first portion of scrubbed normally gaseous fraction in an amount to raise the temperature of the mixture to around 400° C. and the mixture is passed first through a water gas shift conversion zone and then through a separate carbon dioxide scrubbing zone and the second portion of the product of said partial combustion zone uncooled is combined with the effluent from the separate carbon dioxide scrubbing zone before being passed to the cracking zone.

4. Process for the thermal cracking of refractory aromatic oils which comprises cooling and scrubbing the vaporous product from the thermal reacting zone, which product is obtained as hereinafter specified, to separate said product into a normally liquid fraction of cracking products and a normally gaseous product fraction substantially devoid of normally liquid hydrocarbon substituents, treating at least a portion of said gaseous product fraction with an absorbent for $CO_2$ under conditions to remove at least a part of the $CO_2$, dividing the treated fraction into two parts (a) and (b), reacting part (a) under a pressure of from about 6 to 36 atmospheres in a partial combustion zone with an oxygen-rich gas in an amount sufficient for combustion to CO and insufficient for complete combustion to $CO_2$, combining part (b) with the product from said partial combustion zone, contacting the oil to be thermally cracked with the combined gas stream in a thermal cracking zone under a pressure of from about 6 to 35 atmospheres, cooling the vaporous effluent from said thermal reaction zone, and separating therefrom normally liquid cracked products and a gaseous fraction consisting predominantly of carbon monoxide which is recycled at least in part as aforesaid.

5. Process for the thermal cracking of aromatic oils which comprises mixing the aromatic oil to be cracked with recycled product gas substantially free of condensable hydrocarbons and hot partially combusted product gas in an amount to provide a cracking temperature in the range from about 300° to 750° C., passing the mixture in the vapor phase through a thermal cracking zone under a pressure between about 6 and 36 atmospheres, separating the effluent from said thermal cracking zone into a residual fraction, a normally liquid cracked product fraction and a normally gaseous fraction consisting predominantly of carbon monoxide and containing no appreciable amount of normally liquid hydrocarbon constituents, scrubbing carbon dioxide from at least a portion of said normally gaseous fraction, passing a first portion of the scrubbed normally gaseous fraction as recycle product to said thermal cracking zone, partially combusting a second portion of said scrubbed normally gaseous fraction with commercial oxygen at a temperature above 1000° C., the partial combustion favoring the formation of CO rather than $CO_2$, and passing the combustion gases to said thermal cracking zone as said hot partially combusted product gas.

6. The process according to claim 5 wherein a first portion of the product of said partial combustion zone is mixed with said first portion of scrubbed normally gaseous fraction in an amount to raise the temperature of the mixture to around 400° C. and the mixture is passed first through a water gas shift conversion zone and then through a separate carbon dioxide scrubbing zone and the second portion of the product of said partial combustion zone uncooled is combined with the effluent from the separate carbon dioxide scrubbing zone before being passed to the thermal cracking zone.

7. The process according to claim 4 in which the cooling and scrubbing of the vaporous reaction product from the thermal cracking zone is effected at least in part with cooled liquid feed to the process.

8. The process according to claim 4 wherein said cooling and scrubbing is effected in at least two stages, viz. first with a cooled recycled heavy condensate of the reaction product stream and second with cooled liquid feed to the process.

9. The process according to claim 4 wherein all of the specified operations are effected except for normal pressure drops caused by the flows at essentially the same super atmospheric pressure of about 6 to 36 atmospheres.

10. The process according to claim 4 wherein at least a portion of part (b) of said treated gaseous product is subjected to a water gas shift conversion and then scrubbed to remove at least part of the $CO_2$ prior to combining said part with said part (a) to said thermal cracking zone.

11. The process of claim 4 wherein part (b) of said treated gaseous product fraction and a portion of part (a) after reaction in said partial combustion zone are passed together through a water gas shift conversion zone and a following $CO_2$ absorption zone before being passed to the thermal cracking zone.

12. The process of claim 5 wherein the said normally gaseous fraction is obtained from the effluent of said thermal cracking zone substantially free of liquid hydrocarbons by scrubbing the gaseous fraction with cooled liquid feed to be cracked.

References Cited by the Examiner

UNITED STATES PATENTS

| | | | |
|---|---|---|---|
| 1,850,291 | 3/1932 | Seguy | 208—129 |
| 2,371,147 | 3/1945 | Burk | 208—129 |
| 2,698,830 | 1/1955 | Jenny | 208—129 |
| 2,989,460 | 6/1961 | Eastman et al. | 208—107 |

DELBERT E. GANTZ, *Primary Examiner.*

ALPHONSO D. SULLIVAN, *Examiner.*